United States Patent
Saito et al.

(10) Patent No.: US 9,464,176 B2
(45) Date of Patent: *Oct. 11, 2016

(54) PROCESS FOR PRODUCING FLUORINATED COPOLYMER

(71) Applicant: Asahi Glass Company, Limited, Tokyo (JP)

(72) Inventors: Susumu Saito, Tokyo (JP); Kaori Abe, Tokyo (JP); Tetsuji Shimohira, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/657,844

(22) Filed: Mar. 13, 2015

(65) Prior Publication Data

US 2015/0183946 A1 Jul. 2, 2015

Related U.S. Application Data

(63) Continuation of application No. PCT/JP2013/077147, filed on Oct. 4, 2013.

(30) Foreign Application Priority Data

Oct. 29, 2012 (JP) .................... 2012-237834

(51) Int. Cl.
| | |
|---|---|
| *C08J 5/22* | (2006.01) |
| *B01J 47/12* | (2006.01) |
| *C08F 214/18* | (2006.01) |
| *C25B 13/08* | (2006.01) |
| *C08F 2/00* | (2006.01) |
| *C08L 27/12* | (2006.01) |
| *C08F 6/00* | (2006.01) |
| *C08F 216/14* | (2006.01) |

(52) U.S. Cl.
CPC ............... *C08J 5/225* (2013.01); *B01J 47/12* (2013.01); *C08F 2/00* (2013.01); *C08F 6/003* (2013.01); *C08F 6/008* (2013.01); *C08F 214/18* (2013.01); *C08F 216/1408* (2013.01); *C08F 216/1466* (2013.01); *C08J 5/22* (2013.01); *C25B 13/08* (2013.01); *C08F 2216/1475* (2013.01); *C08J 2329/10* (2013.01)

(58) Field of Classification Search
CPC .... C08F 6/003; C08F 228/02; C08F 220/08; C08F 214/26; C08F 214/262; C08F 214/18; C08F 2/00; C08F 6/008; C08F 216/1408; C08F 216/1466; C08J 5/225; C08J 5/22; C08J 2329/10; B01J 47/12; C25B 13/08
USPC .......................................... 521/27
See application file for complete search history.

(56) References Cited

U.S. PATENT DOCUMENTS

| | | | |
|---|---|---|---|
| 2010/0048956 A1* | 2/2010 | Isaka | C08F 6/003 568/32 |
| 2014/0100344 A1* | 4/2014 | Aida | C08F 214/18 526/243 |

FOREIGN PATENT DOCUMENTS

| | | | |
|---|---|---|---|
| JP | 57-76002 | 5/1982 | |
| JP | 62-179508 | 8/1987 | |
| JP | 10-195212 | 7/1998 | |
| JP | 11-158218 | 6/1999 | |
| JP | CA 2497332 A1 * | 8/2005 | ............... B29B 9/04 |
| JP | 3781498 | 3/2006 | |
| JP | 2007-119526 | 5/2007 | |
| WO | 2008/069301 | 6/2008 | |
| WO | 2009/133902 | 11/2009 | |
| WO | 2012/157715 | 11/2012 | |
| WO | 2012/173153 | 12/2012 | |

OTHER PUBLICATIONS

Derwent Abstract of JP 57076002 A1, 1985.*
International Search Report Issued in International Application No. PCT/JP2013/077147, filed on Oct. 4, 2013.

* cited by examiner

*Primary Examiner* — Michael M Bernshteyn
(74) *Attorney, Agent, or Firm* — Oblon, McClelland, Maier & Neustadt, L.L.P.

(57) ABSTRACT

To provide a process by which from a mixture containing a fluorinated copolymer, an unreacted monomer and a polymerization medium, the unreacted monomer and the polymerization medium can efficiently be recovered, and a lower polymer contained in the obtainable fluorinated copolymer can readily be reduced. A process for producing a fluorinated copolymer comprising (I) a step of polymerizing a fluorinated monomer having a carboxylic acid functional group or a sulfonic acid fanctional group and a fluorinated olefin in a polymerization medium to obtain a mixture containing a fluorinated copolymer, the unreacted monomer and the polymerization medium, (II) a step of continuously or intermittently transferring the mixture to an evaporation container equipped with a stirring machine and heating the mixture in the evaporation container with stirring to evaporate and recover the unreacted monomer and the polymerization medium and to obtain the fluorinated copolymer, and (III) a step of washing the fluorinated copolymer with a washing medium.

11 Claims, No Drawings

PROCESS FOR PRODUCING FLUORINATED COPOLYMER

TECHNICAL FIELD

The present invention relates to a process for producing a fluorinated copolymer having carboxylic acid functional groups or sulfonic acid functional groups.

BACKGROUND ART

As an ion exchange membrane to be used for an alkali chloride electrolysis method in which an alkali chloride aqueous solution such as salt water is electrolyzed to produce an alkali hydroxide and chlorine, a membrane comprising a fluorinated copolymer having carboxylic acid functional groups or sulfonic acid functional groups has been known. Further, as an ion exchange membrane used as an electrolyte membrane for a fuel cell, a membrane comprising a fluorinated copolymer having sulfonic acid functional groups has been known.

The fluorinated copolymer is obtainable, for example, by copolymerizing a fluorinated monomer having a carboxylic acid functional group or a sulfonic acid functional group, such as a perfluorovinyl ether, and a fluorinated olefin such as tetrafluoroethylene (hereinafter referred to as TFE).

As a polymerization method, an emulsion polymerization method, a solution polymerization method, a suspension polymerization method or a bulk polymerization method may, for example, be mentioned. After the fluorinated copolymer is obtained by such a polymerization method, a step is required to separate and recover the polymerization medium or the unreacted monomer from the obtained fluorinated copolymer, and specifically, the following methods have been known.

(1) A method of pouring a slurry obtained by solution polymerization to a poor solvent such as methanol to agglomerate the fluorinated copolymer (Patent Document 1).

(2) A method of extracting the unreacted monomer by solvent extraction from an emulsion obtained by emulsion polymerization, and adding an acid to agglomerate the fluorinated copolymer (Patent Document 2).

(3) A method of purging the pressure of the reactor after polymerization, and evacuating the reactor of air by means of a cold trap with stirring to recover the polymerization medium and the unreacted monomer (Patent Document 3).

However, in the methods (1) and (2), it is necessary to carry out agglomeration operation repeatedly several times and to distill off the solvent used for agglomeration to recover the fluorinated monomer, in order that the fluorinated monomer having a carboxylic acid functional group or a sulfonic acid functional group which is expensive, is completely recovered, thus leading to a high cost.

In the method (3), the fluorinated copolymer is aggregated in the reactor as recovery of the polymerization medium and the unreacted monomer proceeds, whereby heat transfer from the reactor to the aggregated fluorinated copolymer is inhibited, and the polymerization medium and the unreacted monomer proceeds, whereby heat transfer from the reactor to the aggregated fluorinated copolymer is inhibited, and the polymerization medium and the unreacted monomer contained in the aggregated fluorinated copolymer are hardly heated. Thus, the expensive fluorinated monomer having a carboxylic acid functional group or a sulfonic acid functional group may not completely be recovered in a short time.

Further, in the method (3), a lower polymer (oligomer) having a low molecular weight may not be recovered together with polymerization medium and the unreacted monomer, and remain in the aggregated fluorinated copolymer. If the lower polymer remains in the fluorinated copolymer, it may lead to bubbling when the fluorinated copolymer is formed into a membrane, or when a membrane of the fluorinated copolymer is laminated with another membrane, they may be peeled off from each other at their interface.

In order to reduce the lower polymer contained in the fluorinated copolymer, washing of the fluorinated copolymer may be considered. However, for washing, it is necessary to finely pulverize the agglomerated fluorinated copolymer, such being troublesome and requiring cost.

Accordingly, a method has been desired in which the polymerization medium and the fluorinated monomer having a carboxylic acid functional group or a sulfonic acid functional group are recovered efficiently, and the lower polymer contained in the obtainable fluorinated copolymer can be reduced easily at a low cost.

PRIOR ART DOCUMENTS

Patent Documents

Patent Document 1: WO2009/133902
Patent Document 2: JP-A-2007-119526
Patent Document 3: Japanese Patent No. 3,781,498

DISCLOSURE OF INVENTION

Technical Problem

The present invention provides a process for producing a fluorinated copolymer, which comprises polymerizing a fluorinated monomer having a carboxylic acid functional group or a sulfonic acid functional group and a fluorinated olefin in a polymerization medium, whereby the unreacted monomer and the polymerization medium can be recovered efficiently from a mixture containing the fluorinated copolymer, the unreacted monomer and the polymerization medium, and a process for producing a fluorinated copolymer without using a polymerization medium, whereby the unreacted monomer can be recovered efficiently from a mixture containing the fluorinated copolymer and the unreacted monomer, and the lower polymer contained in the obtainable fluorinated copolymer can be reduced easily at a low cost.

Solution to Problem

The process for producing a fluorinated copolymer according to a first embodiment of the present invention is a process comprising the following steps (I) to (III):

(I) a step of polymerizing a fluorinated monomer having a carboxylic acid functional group or a sulfonic acid functional group and a fluorinated olefin in a polymerization medium to obtain a mixture containing a fluorinated copolymer, the unreacted monomer and the polymerization medium;

(II) a step of continuously or intermittently transferring the mixture obtained in the step (I) to an evaporation container equipped with a stirring machine and heating the mixture in the evaporation container with stirring to evaporate and recover the unreacted monomer and the polymerization medium and to obtain the fluorinated copolymer; and (III) a step of washing the fluorinated copolymer obtained in the step (II) with a washing medium.

Further, the process for producing a fluorinated copolymer according to a second embodiment of the present invention is a process comprising the following steps (I') to (III'):

(I') a step of polymerizing a fluorinated monomer having a carboxylic acid functional group or a sulfonic acid functional group and a fluorinated olefin to obtain a mixture containing a fluorinated copolymer and the unreacted monomer;

(II') a step of continuously or intermittently transferring the mixture obtained in the step (I') to an evaporation container equipped with a stirring machine and heating the mixture in the evaporation container with stirring to evaporate and recover the unreacted monomer and to obtain the fluorinated copolymer; and (III') a step of washing the fluorinated copolymer obtained in the step (II') with a washing medium.

The proportion of units of the fluorinated monomer having a carboxylic acid functional group or a sulfonic acid functional group in the fluorinated copolymer is preferably from 15 to 85 mass %.

Further, the proportion of fluorinated olefin units in the fluorinated copolymer is preferably from 10 to 90 mass %.

The washing medium is preferably a solvent such that the degree of swelling of the fluorinated copolymer is from 30 to 100 mass % as measured by the following measurement method:

(Method for Measuring Degree of Swelling)
1. The fluorinated copolymer obtained in the step (II) or (II') is hot-pressed to be formed into a film having a thickness of 100 μm, a sample having a size of 20 mm×20 mm is cut from the film, and its dry mass (WA1) is measured;
2. The sample is dipped in the solvent at the washing temperature in the step (III) or (III') for 16 hours;
3. The sample is taken out from the solvent, the solvent on the surface of the sample is quickly wiped off, and the mass (WA2) of the sample is measured;
4. The degree of swelling is determined from the following formula (1):

$$\text{Degree of swelling (\%)}=(WA2-WA1)/WA1\times 100 \quad (1)$$

The washing medium preferably contains at least one member selected from the group consisting of a hydrofluorocarbon, a hydrofluoroether and a perfluorocarbon.

The fluorinated monomer having a carboxylic acid functional group or a sulfonic acid functional group is preferably a compound represented by the following formula (m1):

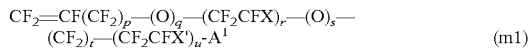
(m1)

wherein X is a fluorine atom or a trifluoromethyl group, X' is a fluorine atom or a trifluoromethyl group, $A^1$ is a carboxylic acid functional group or a sulfonic acid functional group, p is 0 or 1, q is 0 or 1, r is an integer of from 0 to 3, s is 0 or 1, t is an integer of from 0 to 12, u is an integer of from 0 to 3, and 1≤r+u.

The fluorinated olefin is preferably tetrafluoroethylene.

A stirring blade in the evaporation container equipped with a stirring machine is preferably a helical ribbon blade.

It is preferred that in the step (II) or (II'), the mixture is transferred to the evaporation container so that the overall coefficient of heat transfer is at least 80 kJ/m²·h·° C.

It is preferred that in the step (III) or (III'), the fluorinated copolymer is washed with the washing medium in a stirring tank under normal pressure, followed by solid-liquid separation by filtration.

The fluorinated copolymer obtainable by the present invention preferably has an average particle size of from 0.10 to 10 mm and an ion exchange capacity of from 0.5 to 2.0 meq/g.

The fluorinated copolymer obtained by the present invention is useful as an ion exchange membrane.

Advantageous Effects of Invention

According to the production process of the present invention, it is possible to efficiently recover from a mixture containing a fluorinated copolymer, an unreacted monomer and a polymerization medium, the unreacted monomer and the polymerization medium, or from a mixture containing a fluorinated copolymer and an unreacted monomer, the unreacted monomer, with a small solvent amount, and it is possible to easily reduce a lower polymer contained in the obtainable fluorinated copolymer, and accordingly it is possible to produce a high quality fluorinated copolymer profitably.

DESCRIPTION OF EMBODIMENTS

In this specification, a compound represented by the formula (m1) will be referred to as a compound (m1). The same applies to compounds represented by other formulae.

The following definition of terms is applicable to the present specification and the claims.

A monomer is a compound having a polymerizable carbon-carbon double bond.

The carboxylic acid functional group means a carboxylic acid group (—COOH) itself or a functional group capable of being converted to a carboxylic acid group by hydrolysis or neutralization.

The sulfonic acid functional group means a sulfonic acid group (—SO₃H) itself or a functional group capable of being converted to a sulfonic acid group by hydrolysis or neutralization.

The lower polymer means a so-called oligomer in which the number of monomer units constituting the polymer is relatively small (the degree of polymerization is relatively low). The lower polymer is a component which has influences over properties of the obtainable fluorinated copolymer, and its molecular weight (degree of polymerization) varies depending upon the application (properties required) of the fluorinated copolymer.

"The mixture is continuously transferred to the evaporation container" means a state where the mixture is always supplied to the evaporation container.

"The mixture is intermittently transferred to the evaporation container" means a state where a time when the mixture is supplied to the evaporation container and a time when it is not are alternately present.

<Process for Producing Fluorinated Copolymer>

The process for producing a fluorinated copolymer according to a first embodiment of the present invention is a process comprising the following steps (I) to (III), applicable in the case of a polymerization method using a polymerization medium, such as an emulsion polymerization method, a solution polymerization method or a suspension polymerization method.

(I) a step of polymerizing a fluorinated monomer having a carboxylic acid functional group or a sulfonic acid functional group and a fluorinated olefin in a polymerization medium to obtain a mixture containing a fluorinated copolymer, the unreacted monomer and the polymerization medium;

(II) a step of continuously or intermittently transferring the mixture obtained in the step (I) to an evaporation container equipped with a stirring machine and heating the mixture in the evaporation container with stirring to evaporate and recover the unreacted monomer and the polymerization medium and to obtain the fluorinated copolymer; and (III) a step of washing the fluorinated copolymer obtained in the step (II) with a washing medium.

The process for producing a fluorinated copolymer according to a second embodiment of the present invention is a process comprising the following steps (I') to (III'), applicable in the case of a polymerization method using no polymerization medium (excluding monomers) such as a bulk polymerization method.

(I') a step of polymerizing a fluorinated monomer having a carboxylic acid functional group or a sulfonic acid functional group and a fluorinated olefin to obtain a mixture containing a fluorinated copolymer and the unreacted monomer;

(II') a step of continuously or intermittently transferring the mixture obtained in the step (I') to an evaporation container equipped with a stirring machine and heating the mixture in the evaporation container with stirring to evaporate and recover the unreacted monomer and to obtain the fluorinated copolymer; and (III') a step of washing the fluorinated copolymer obtained in the step (II') with a washing medium.

(Fluorinated Monomer)

The fluorinated monomer having a carboxylic acid functional group or a sulfonic acid functional group is not particularly limited so long as it is a compound having at least one fluorine atom, a polymerizable carbon-carbon double bond and a carboxylic acid functional group or a sulfonic acid functional group in its molecule, and known one may be used.

The fluorinated monomer is preferably a compound (m1) in view of the production cost of the monomer, the reactivity with another monomer and excellent properties of the obtainable fluorinated copolymer.

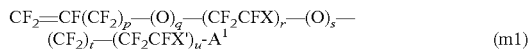

(m1)

X is a fluorine atom or a trifluoromethyl group. Further, X' is a fluorine atom or a trifluoromethyl group. In a case where both X and X' are present in one molecule, they may be the same or different from each other.

$A^1$ is a carboxylic acid functional group or a sulfonic acid functional group. The carboxylic acid functional group means a carboxylic acid group (—COOH) itself or a functional group capable of being converted to a carboxylic acid group by hydrolysis or neutralization.

The functional group capable of being converted to a carboxylic acid group may, for example, be —CN, —COF, —COOR$^1$ (wherein R$^1$ is a $C_{1-10}$ alkyl group), —COOM (wherein M is an alkali metal or a quaternary ammonium salt group), —COONR$^2$R$^3$ (wherein each of R$^2$ and R$^3$ which may be the same or different, is a hydrogen atom or a $C_{1-10}$ alkyl group).

The sulfonic acid functional group means a sulfonic acid group (—SO$_3$H) itself or a functional group capable of being converted to a sulfonic acid group by hydrolysis or neutralization.

The functional group capable of being converted to a sulfonic acid group may, for example, be —SO$_3$M (wherein M is an alkali metal or a quaternary ammonium salt group), —SO$_2$F, —SO$_2$Cl or —SO$_2$Br.

p is 0 or 1, q is 0 or 1, r is an integer of from 0 to 3, s is 0 or 1, t is an integer of from 0 to 12, and u is an integer of from 0 to 3, provided that r and u are not simultaneously 0, that is, 1≤r+u.

As specific examples of the compound (m1) having a carboxylic acid functional group, the following compounds may be mentioned, and in view of easy production, preferred is a compound wherein p=0, q=1, r=1, s=0 to 1, t=1 to 3, and u=0 to 1, particularly preferred is CF$_2$=CF—O—CF$_2$CF$_2$—CF$_2$—COOCH$_3$, or CF$_2$=CF—O—CF$_2$CF(CF$_3$)—O—CF$_2$CF$_2$—COOCH$_3$:

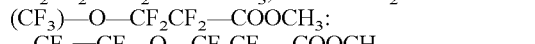
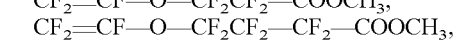
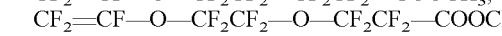
COOCH$_3$,
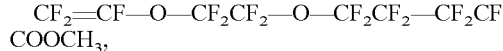
COOCH$_3$,
COOCH$_3$,
COOCH$_3$.

The compound (m1) having a sulfonic acid functional group is preferably a compound (m2) or (m3) in view of the production cost of the monomer, the reactivity with another monomer and excellent properties of the obtainable fluorinated copolymer.

  (m2)

  (m3)

$R^{f2}$ is a $C_1$-$C_{20}$ perfluoroalkylene group, which may have an etheric oxygen atom and which may be linear or branched.

$A^2$ is a sulfonic acid functional group.

As the compound (m2), specifically, the following compounds are preferred.
CF$_2$=CF—O—(CF$_2$)$_{1-8}$—SO$_2$F,
CF$_2$=CF—O—CF$_2$CF(CF$_3$)O(CF$_2$)$_{1-8}$—SO$_2$F,
CF$_2$=CF[OCF$_2$CF(CF$_3$)]$_{1-5}$SO$_2$F.

As the compound (m3), specifically, the following compound is preferred.
CF$_2$=CF(CF$_2$)$_{0-8}$—SO$_2$F,
CF$_2$=CF—CF$_2$—O—(CF$_2$)$_{1-8}$—SO$_2$F.

The fluorinated monomer having a sulfonic acid functional group is more preferably the following compounds, in view of easy industrial preparation.
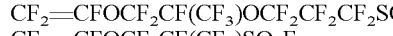
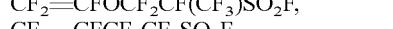
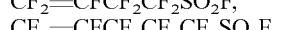
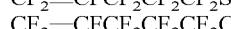
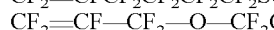
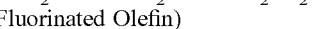
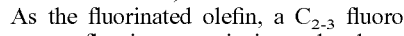

(Fluorinated Olefin)

As the fluorinated olefin, a $C_{2-3}$ fluoroolefin having at least one fluorine atom in its molecule may be used. The fluoroolefin may, for example, be TFE(CF$_2$=CF$_2$), chlorotrifluoroethylene (CF$_2$=CFCl), vinylidene fluoride (CF$_2$=CH$_2$), vinyl fluoride (CH$_2$=CHF) or hexafluoropropylene (CF$_2$=CFCF$_3$). In view of the production cost of the monomer, the reactivity with another monomer and excellent properties of the obtainable fluorinated copolymer, particularly preferred is TFE. The fluorinated olefin may be used alone or in combination of two or more.

(Another Monomer)

In the present invention, in addition to the fluorinated monomer having a carboxylic acid functional group or a sulfonic acid functional group and the fluorinated olefin, another monomer may be copolymerized. Such another monomer may, for example, be CF$_2$=CF—R$^f$ (wherein R$^f$ is a C$_{1-10}$ perfluoroalkyl group containing an etheric oxygen atom in the middle of the molecular chain), CF$_2$=CF—OR$^{f1}$ (wherein R$^{f1}$ is a C$_{1-10}$ perfluoroalkyl group which may contain an etheric oxygen atom in the middle of the molecular chain) or CF$_2$=CFO(CF$_2$)$_v$CF=CF$_2$ (wherein v is an integer of from 1 to 3). By copolymerizing such another monomer, the flexibility and the mechanical strength of an obtainable ion exchange membrane can be improved. The proportion of such another monomer is preferably at most 30 mass %, more preferably from 1 to 20 mass % in all the monomers (100 mass %) with a view to maintaining the ion exchange performance.

(Steps (I) and (I'))

In the case of the production process according to a first embodiment of the present invention, in a reactor, the fluorinated monomer having a carboxylic acid functional group or a sulfonic acid functional group and the fluorinated olefin are polymerized in a polymerization medium to obtain a mixture (an emulsion, a slurry or the like) containing a fluorinated copolymer, the unreacted monomer and the polymerization medium.

In the case of the production process according to a second embodiment of the present invention, in a reactor, the fluorinated monomer having a carboxylic acid functional group or a sulfonic acid functional group and the fluorinated olefin are polymerized to obtain a mixture containing a fluorinated copolymer and the unreacted monomer.

The polymerization method is selected from polymerization methods such as an emulsion polymerization method, a solution polymerization method, a suspension polymerization method and a bulk polymerization method. The polymerization method is preferably a solution polymerization method using no fluorinated emulsifying agent having a perfluoroalkyl group having at least 7 carbon atoms, the bioaccumulation property of which is a concern.

The polymerization medium to be used in the emulsion polymerization method is preferably water.

The emulsifying agent to be used in the emulsion polymerization method is preferably a perfluorocarboxylic acid type emulsifying agent.

The polymerization medium to be used in the solution polymerization method is preferably chlorofluorocarbon, hydrochlorofluorocarbon, hydrofluorocarbon, hydrofluoroether or the like, more preferably hydrofluorocarbon or hydrofluoroether which will not damage the ozone layer.

The hydrofluorocarbon is preferably one having from 4 to 10 carbon atoms, more preferably from 4 to 8 carbon atoms. If the hydrofluorocarbon has less than 4 carbon atoms or more than 10 carbon atoms, the boiling point of such a hydrofluorocarbon will be out of the desired temperature range (from 0 to 200° C., preferably from 10 to 100° C.). That is, when the hydrofluorocarbon has at least 4 carbon atoms, its boiling point is at least 0° C., such being suitable for storage and transfer. When the hydrofluorocarbon has at most 10 carbon atoms, its boiling point is at most 200° C., whereby the polymerization medium will easily be recovered from the slurry after polymerization.

The hydrofluorocarbon is preferably one having a ratio of the number of hydrogen atoms/the number of fluorine atoms (hereinafter referred to as H/F) on a molar basis of from 0.05 to 20, more preferably from 0.06 to 1. If the H/F ratio is less than 0.05, the solubility of the polymerization initiator described hereinafter will be insufficient. If the H/F ratio exceeds 20, the chain transfer constant of the polymerization reaction tends to be large, whereby a fluorinated copolymer having a desired molecular weight will not be obtained.

The molecular structure of the hydrofluorocarbon may be linear or branched.

As specific examples of the hydrofluorocarbon, the following compounds are mentioned.

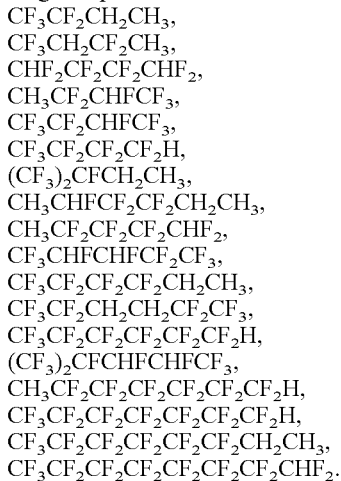

Since if the number of carbon atoms is too small, the boiling point tends to be too low, if the number of carbon atoms is too large, the boiling point tends to be too high, and if the number of hydrogen atoms is large, a copolymer having a high molecular weight will hardly be obtained, the hydrofluorocarbon is preferably a hydrofluorocarbon represented by C$_{n+m}$F$_{2n+1}$H$_{2m+1}$ (wherein n is an integer of from 2 to 8, and m is an integer of from 0 to 3), particularly preferably CF$_3$CF$_2$CF$_2$CF$_2$CF$_2$CF$_2$H (1,1,1,2,2,3,3,4,4,5,5,6,6-tridecafluorohexane, H/F ratio:0.077), CF$_3$CF$_2$CF$_2$CF$_2$CH$_2$CH$_3$ (1,1,1,2,2,3,3,4,4-nonafluorohexane, H/F ratio:0.56) or CF$_3$CF$_2$CF$_2$CF$_2$CF$_2$CF$_2$CH$_2$CH$_3$ (1,1,1,2,2,3,3,4,4,5,5,6,6-tridecafluorooctane, H/F ratio: 0.38).

The hydrofluoroether is a compound (m4) (a hydrofluoroalkyl ether, hereinafter referred to as HFE):

Each of R$^4$ and R$^5$ is a polyfluoroalkyl group, at least one of R$^4$ and R$^5$ has a hydrogen atom, and the total number of carbon atoms of R$^4$ and R$^5$ is from 3 to 8.

The polyfluoroalkyl group is preferably a linear or branched hydrofluoroalkyl group or perfluoroalkyl group. In a case where either one of R$^4$ and R$^5$ is a perfluoroalkyl group, the other is a hydrofluoroalkyl group. If both R$^4$ and R$^5$ are a perfluoroalkyl group, such a compound has a high global warming potential. Further, R$^4$ and R$^5$ may be polyfluoroalkyl groups which are the same or different.

The total number of fluorine atoms which R$^4$ and R$^5$ have is preferably larger than the total number of hydrogen atoms. If the number of hydrogen atoms is large, the chain transfer constant tends to be large, and accordingly the number of hydrogen atoms is preferably smaller, whereby the chain transfer constant will be smaller. The total number of fluorine atoms which $R^4$ and $R^5$ have is preferably at least 60%, more preferably at least 65% to the total number of hydrogen atoms and fluorine atoms.

The total number of carbon atoms of $R^4$ and $R^5$ is from 3 to 8, preferably from 4 to 6. If the number of carbon atoms of $R^4$ and $R^5$ is too small, such a compound tends to have a low boiling point, and its handling as a polymerization medium tends to be difficult. If the number of carbon atoms of $R^4$ and $R^5$ is too large, such a compound has a high boiling point, and separation of a fluorinated copolymer and the polymerization medium tends to be difficult.

HFE is preferably at least one member selected from the group consisting of $CF_3CH_2OCF_2CF_2H$, $CHF_2CF_2CH_2OCF_2CF_2H$ and $CF_3CF_2CH_2OCF_2CF_2H$, more preferably $CF_3CH_2OCF_2CF_2H$.

The proportions of charge of the fluorinated monomer having a carboxylic acid functional group or a sulfonic acid functional group and the fluorinated olefin are selected so that the proportion of the monomer units in the obtainable fluorinated copolymer is within a desired range.

The proportion of charge of the fluorinated monomer having a carboxylic acid functional group or a sulfonic acid functional group is preferably such that the proportion of the units of the fluorinated monomer having a carboxylic acid functional group or a sulfonic acid functional group in the fluorinated copolymer is from 15 to 85 mass %, more preferably from 20 to 75 mass %.

The proportion of charge of the fluorinated olefin is preferably such that the proportion of the fluorinated olefin units in the fluorinated copolymer is from 10 to 90 mass %, more preferably from 20 to 80 mass %.

The proportion of charge of another monomer is preferably such that the proportion of the units of another monomer in the fluorinated copolymer is from 0 to 30 mass %, more preferably from 1 to 20 mass %.

The respective monomers may be charged all at once, or may be charged continuously or intermittently. From a viewpoint such that the concentration of each monomer in the reaction system is constant so that the composition of the fluorinated copolymer to be formed is uniform, it is preferred to continuously add and continuously react the fluorinated monomer having a carboxylic acid functional group or a sulfonic acid functional group and the fluorinated olefin.

The polymerization pressure (gauge pressure) is preferably from 0.1 to 5.0 MPaG, more preferably from 0.5 to 3.0 MPaG. Within such a range, the polymerization rate can be maintained to be a practically satisfactory level, and a high molecular weight fluorinated copolymer can be obtained.

The conditions and operations other than the polymerization pressure are not particularly limited, and reaction conditions can be selected from a wide range. For example, an optimum polymerization temperature is selected depending upon the type of the monomer, the proportion of charge and the like, and in view of industrial applicability, the polymerization temperature is preferably from 20 to 150° C., more preferably from 30 to 130° C.

Polymerization may be initiated by irradiation with ionizing radiation, however, use of a polymerization initiator having high activity at the above preferred reaction temperature (from 20 to 150° C.) such as an azo compound or a peroxy compound is advantageous for industrial application.

The polymerization initiator may, for example, be a diacyl peroxide (such as disuccinic acid peroxide, benzoyl peroxide, perfluoro-benzoyl peroxide, lauroyl peroxide or bis(pentafluoropropionyl) peroxide), an azo compound (such as 2,2'-azobis(2-amidinopropane)hydrochloride, 4,4'-azobis(4-cyanovalerianic acid), dimethyl 2,2'-azobisisobutyrate or azobisisobutyronitrile), a peroxyester (such as t-butyl peroxyisobutyrate or t-butyl peroxypivalate), a peroxydicarbonate (such as diisopropyl peroxydicarbonate or bis(2-ethylhexyl)peroxydicarbonate), a hydroperoxide (such as diisopropylbenzene hydroperoxide or t-butyl hydroperoxide), or a dialkyl peroxide (such as di-t-butyl peroxide or perfluoro-di-t-butyl peroxide).

The amount of addition of the polymerization initiator is preferably from 0.0001 to 3 parts by mass, more preferably from 0.0001 to 2 parts by mass per 100 parts by mass of all the monomers. By reducing the amount of addition of the polymerization initiator, the molecular weight of the fluorinated copolymer can be made high. In addition to the polymerization initiator, a molecular weight-controlling agent or the like commonly used for solution polymerization may be added.

The molecular weight-controlling agent is preferably an alcohol (such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol), a hydrocarbon (such as n-pentane, n-hexane or cyclohexane), a hydrofluorocarbon (such as $CF_2H_2$), a ketone (such as acetone), a mercaptan (such as methylmercaptan), an ester (such as methyl acetate or ethyl acetate), or an ether (such as diethyl ether or methyl ethyl ether), more preferably an alcohol.

The amount of the molecular weight-controlling agent is preferably from 0.0001 to 50 parts by mass, more preferably from 0.001 to 10 parts by mass per 100 parts by mass of all the monomers.

(Steps (II) and (II'))

In the case of the production process according to a first embodiment of the present invention, while the mixture (emulsion or slurry) in the reactor is continuously or intermittently transferred to an evaporation container equipped with a stirring machine, and the mixture is continuously heated in the evaporation container with stirring, to continuously evaporate and recover the unreacted monomer and the polymerization medium and separate them from the fluorinated copolymer.

In the case of the production process according to a second embodiment of the present invention, while the mixture in the reactor is continuously or intermittently transferred to an evaporation container equipped with a stirring machine, and the mixture is continuously heated in the evaporation container with stirring to continuously evaporate and recover the unreacted monomer to separate it from the fluorinated copolymer.

Since the fluorinated monomer having a carboxylic acid functional group or a sulfonic acid functional group may be decomposed by oxygen or moisture, the evaporation container is preferably capable of stirring the mixture transferred in an inert gas (e.g. nitrogen gas) atmosphere, in vacuum or reduced-pressure atmosphere.

As a stirring blade in the stirring machine, a paddle blade, a turbine blade, an anchor blade, a helical ribbon blade or the like is preferred. The stirring machine may have a scraping blade rotating while being rubbed against the wall surface, so as to prevent deposition of the fluorinated copolymer on the inner wall of the evaporation container.

The stirring blade is preferably an anchor blade or a helical ribbon blade suitable for mixing a liquid having a high viscosity, and is particularly preferably a helical ribbon blade.

Although the optimum number of revolutions varies depending upon the shape of the stirring blade and the size of the evaporation container, the number of revolutions is preferably from about 30 to about 500 rpm, more preferably from 50 to 300 rpm, further preferably from 70 to 200 rpm.

The evaporation container is preferably one which can be heated e.g. by a jacket, so as to evaporate the polymerization medium or the unreacted monomer. The heating temperature is preferably from 20 to 150° C., more preferably from 40 to 120° C., further preferably from 50 to 100° C. The heating temperature is determined by the boiling points of the polymerization medium and the fluorinated monomer, and is preferably within the above temperature range, since the fluorinated monomer may be thermally decomposed.

In order that the polymerization medium and the unreacted monomer are evaporated at a lower temperature, the pressure in the evaporation container may be reduced to the atmospheric pressure or below.

The pressure (absolute pressure) in the evaporation container is preferably from 0.1 to 200 kPa, more preferably from 0.5 to 100 kPa.

The mixture is continuously or intermittently transferred to the evaporation container. The supply amount per unit time may be constant or inconstant.

If the mixture is charged into the evaporation container all at once and it is heated with stirring to evaporate and recover the polymerization medium and the unreacted monomer in such a state, the fluorinated copolymer will be agglomerated, the heat transfer from the evaporation container to the agglomerated fluorinated copolymer will be inhibited, and the polymerization medium and the unreacted monomer contained in the agglomerated fluorinated copolymer are hardly heated. Accordingly, the polymerization medium and the unreacted monomer cannot efficiently be recovered.

The supply amount per unit time when the mixture is transferred from the reactor to the evaporation container varies depending upon the size of the evaporation container and the type of the stirring machine, and is preferably adjusted to a transfer rate to such an extent that the heat transfer to the fluorinated copolymer in the interior of the evaporation container will not be remarkably deteriorated. Specifically, it is preferably such an extent that the temperature in the interior of the evaporation container can be maintained to a temperature in the vicinity of the boiling point of the polymerization medium or the fluorinated monomer. More specifically, it is preferably such an extent that the temperature in the interior of the evaporation container can be maintained to be from −20 to +20° C. from the higher one of the boiling points of the polymerization medium and the fluorinated monomer under the pressure in the evaporation container. Further, it is preferred to transfer the mixture to the evaporation container so that the overall coefficient of heat transfer is at least 80 kJ/m²·h·° C., more preferably at least 120 kJ/m²·h·° C., most preferably from 200 to 1,300 kJ/m²·h·° C.

If the heat of evaporation of the polymerization medium and the fluorinated monomer will not exceed the amount of heat by heating, the internal temperature of the evaporation container will not be lower than the boiling points of the polymerization medium and the fluorinated monomer, and the fluorinated copolymer will not be agglomerated to inhibit heat transfer, whereby the recovery ratio of the unreacted monomer will be improved.

When a sufficient amount of heat to evaporate the polymerization medium and the fluorinated monomer is supplied, the internal temperature of the evaporation container will not be remarkably higher than the boiling points of the polymerization medium and the fluorinated monomer, a fluorinated copolymer in the form of particles will be formed without consuming unnecessary thermal energy, the process time can be shortened, and the productivity will be improved.

The overall coefficient of heat transfer is a coefficient representing the heat transfer and is obtained from the following formula (2):

$$Q = UA\Delta T \qquad (2)$$

wherein Q is the amount of heat, U is the overall coefficient of heat transfer, A is the heat transfer area, and ΔT is the temperature difference between the interior and the exterior.

As a method of recovering the evaporated unreacted monomer and polymerization medium, a method may, for example, be mentioned in which the evaporation container is evacuated of air by means of a cold trap or a heat exchanger, to recover the unreacted monomer and the polymerization medium.

(Step (III) and Step (III'))

The fluorinated copolymer in the form of particles obtained in the step (II) or (II') is washed with a washing medium. This step may be carried out at a low cost as compared with a conventional agglomeration method.

Washing is carried out by mixing the washing medium and the fluorinated copolymer and stirring the mixture, following by solid-liquid separation.

As the washing medium, a mixture of a good solvent and a poor solvent or either one of a good solvent and a poor solvent may be used, and it is necessary to control the degree of swelling of the fluorinated copolymer considering the washing properties and the filtration properties.

The good solvent in which the fluorinated copolymer is dissolved may, for example, be $CClF_2CF_2CClFH$, $C_4F_9C_2H_5$, $C_6F_{13}CH_2CH_3$, $C_8F_{17}C_2H_5$, $C_6F_{13}H$, $HC_6F_{12}H$, $HC_4F_8H$, $C_6F_{14}$, $C_7F_{16}$, $CF_3CFHCFHCF_2CF_3$, $(CF_3)_2CFCFHCFHCF_3$ or $C_6F_6$, and is preferably $CClF_2CF_2CClFH$, $C_6F_{13}H$, $CF_3CFHCFHCF_2CF_3$, $C_6F_{14}$, $C_7F_{16}$, $C_6F_6$ or the like.

Further, the poor solvent to be used for agglomeration of the fluorinated copolymer may, for example, be $CH_3CCl_2F$, $CF_3CH_2OCF_2CF_2H$, $C_4F_9OCH_3$, $C_4F_9OC_2H_5$, $CF_3CF_2CF_2OCH_3$, $(CF_3)_2CFOCH_3$, $CHF_2CH_2CF_3$, $CF_3CH_2CF_2CH_3$, $F_3C\!-\!C(F)\!=\!CH_2$, methanol, ethanol, 1-propanol, isopropanol, n-butanol, 2-butanol, t-butanol, acetone, acetonitrile, 1,2-dimethoxyethane, cyclopentane, hexane, cyclohexane or heptane, and is preferably $CH_3CCl_2F$, $CF_3CH_2OCF_2CF_2H$, $CF_3CH_2CF_2CH_3$, $CHF_2CH_2CF_3$, methanol or the like.

In the step (III) or (III'), since the degree of swelling of the fluorinated copolymer changes depending upon the pressure, it is preferred to wash the fluorinated copolymer with the washing medium in a stirring tank under normal pressure (atmospheric pressure), in view of stability of the degree of polymerization, and whereby a pressure container is unnecessary, and the fluorinated copolymer can be obtained at a low cost.

Further, in view of the removability of the lower polymer component, and the energy saving, it is preferred to carry out solid-liquid separation by filtration after washing.

Washing is carried out preferably after the fluorinated copolymer is transferred from the evaporation container to a washing tank. For washing, a fluidized bed or a classification layer may be employed. The washing tank is preferably a stirring tank.

Washing may be carried out in a state where the fluorinated copolymer is charged all at once in the washing tank (batch method); or may be carried out in a state where the fluorinated copolymer is continuously taken out from the washing tank while it is continuously supplied to the washing tank. Preferred is the batch method, whereby stirring and filtration may be carried out in the same tank.

The washing medium is preferably such a solvent that the degree of swelling of the fluorinated copolymer is from 30 to 100 mass % as measured by the following measurement method.

(Method for Measuring Degree of Swelling)

1. The fluorinated copolymer obtained in the step (II) or (II') is hot-pressed to be formed into a film having a thickness of 100 μm, a sample having a size of 20 mm×20 mm is cut from the film, and its dry mass (WA1) is measured;
2. The sample is dipped in the solvent at the washing temperature in the step (III) or (III') for 16 hours;
3. The sample is taken out from the solvent, the solvent on the surface of the sample is quickly wiped off, and the mass (WA2) of the sample is measured;
4. The degree of swelling is determined from the following formula (1):

$$\text{Degree of swelling (\%)}=(WA2-WA1)/WA1\times100 \qquad (1)$$

With a solvent such that the degree of swelling of the fluorinated copolymer is at least 30 mass %, the fluorinated copolymer may sufficiently be washed, and the lower polymer contained in the fluorinated copolymer may sufficiently be reduced. With a solvent such that the degree of swelling of the fluorinated copolymer is at most 100 mass %, the amount of the fluorinated copolymer which is dissolved in the solvent may be suppressed, and a decrease in the yield of the fluorinated copolymer may be suppressed. Further, the amount of the fluorinated copolymer which is dissolved in the solvent may be suppressed, whereby solid-liquid separation by filtration will easily be carried out.

The washing medium is more preferably a solvent such that the degree of swelling of the fluorinated copolymer is from 35 to 95 mass %, further preferably from 40 to 90 mass %.

The washing medium is preferably, in view of the compatibility with the fluorinated copolymer, one containing at least one member selected from the group consisting of a hydrofluorocarbon, a hydrofluoroether and a perfluorocarbon, more preferably, in view of no influence over the ozone layer, one containing either one or both of a hydrofluorocarbon and a hydrofluoroether, further preferably one consisting solely of either one or both of a hydrofluorocarbon and a hydrofluoroether. The degree of swelling may be adjusted by mixing two or more washing media in an optional proportion.

The hydrofluorocarbon may be the same hydrofluorocarbon used in the step (I) or (I'), and in view of the compatibility with the fluorinated copolymer and the boiling point of the solvent, more preferred is $CF_3CF_2CF_2CF_2CF_2CF_2H$.

The hydrofluoroether may be the same hydrofluoroether used in the step (I) or (I'), and in view of the compatibility with the fluorinated copolymer and the boiling point of the solvent, more preferred is $CF_3CH_2OCF_2CF_2H$.

The washing medium is preferably, in view of the compatibility with the fluorinated copolymer, the boiling point of the solvent and adjustment of the degree of swelling, preferred is a mixture of $CF_3CF_2CF_2CF_2CF_2CF_2H$ and $CF_3CH_2OCF_2CF_2H$.

The amount of the washing medium is preferably from 3 to 20 times, more preferably from 5 to 10 times the mass of the fluorinated copolymer. If the amount of the washing medium is small, washing may not sufficiently be conducted once, and it is necessary to conduct washing repeatedly. If the amount of the washing medium is large, a treatment after washing such as evaporation and recovery will take long. Further, the number of washing relates to the amount of the washing medium, and if the amount of the washing medium is large, washing once is enough, and if the amount of the washing medium is small, the number of washing increases.

The washing temperature is preferably at least 40° C. and at most the boiling point of the washing medium under the pressure during washing. By heating to at least 40° C., the lower polymer will sufficiently be dissolved and removed. Further, the washing temperature is preferably at most the boiling point of the washing medium under normal pressure, whereby a special pressure container is unnecessary, and the fluorinated copolymer will be obtained at a low cost.

Washing may be carried out under normal pressure (atmospheric pressure), or may be carried out under elevated pressure in a pressure container.

The washing time is preferably from 3 to 24 hours, more preferably from 5 to 16 hours. If the washing time is too short, washing may be insufficient. If the washing time is too long, the productivity of the fluorinated copolymer will be lowered.

Solid-liquid separation after washing may be carried out at the heating temperature, or may be carried out after cooling. Further, filtration may be carried out directly after washing, or filtration may be carried out after adding a poor solvent to precipitate the solid. Further, a method other than filtration, such as centrifugal separation, may be carried out.

(Fluorinated Copolymer)

The fluorinated copolymer obtainable by the production process of the present invention is a fluorinated copolymer of the fluorinated monomer having a carboxylic acid functional group or a sulfonic acid functional group, and the fluorinated olefin.

The average particle size of the fluorinated copolymer is preferably from 0.10 to 10 mm, more preferably from 0.5 to 5.0 mm, particularly preferably from 1.0 to 4.0 mm. When the average particle size of the fluorinated copolymer is within such a range, in the step (II) or (II'), heat transfer from the evaporation container to the fluorinated copolymer will efficiently be carried out. Further, in the step (III) or (III'), the fluorinated copolymer may sufficiently be washed. The average particle size of the fluorinated copolymer can be evaluated by a sieving method.

The amount of the fluorinated monomer having a carboxylic acid functional group or a sulfonic acid functional group remaining in the fluorinated copolymer is preferably at most 1.0 mass %, more preferably at most 0.5 mass %, further preferably at most 0.3 mass % per 100 mass % of the fluorinated copolymer. When the amount of the remaining unreacted monomer is within the above range, the fluorinated monomer which is expensive can be efficiently recovered, whereby the production cost for the fluorinated copolymer can be suppressed.

In the step (I) of forming the fluorinated copolymer, molecular weight distribution occurs, and a lower polymer component (oligomer component) forms. If the oligomer component remains in a large amount, bubbling at the time of forming is likely to occur. Further, it is likely to be eluted at the time of hydrolysis. Further, when a film of such a copolymer is laminated with another film, peeling at their interface is likely to occur.

The ion exchange capacity of the fluorinated copolymer is preferably from 0.5 to 2.0 meq/g dry resin when the fluorinated copolymer is used for an ion exchange membrane. Even when the ion exchange capacity of the fluorinated copolymer is high, the molecular weight of the fluorinated copolymer can be made high, whereby the mechanical property and the durability of the fluorinated copolymer will not be deteriorated. The ion exchange capacity of the fluorinated copolymer is preferably at least 0.6 meq/g dry resin, more preferably at least 0.7 meq/g dry resin, in view of the mechanical property and the electrochemical performance as an ion exchange membrane.

The molecular weight of the fluorinated copolymer relates to the mechanical performance and the film-forming property as an ion exchange membrane. The molecular weight of the fluorinated copolymer is preferably at least 150° C., more preferably from 170 to 340° C., further preferably from 170 to 300° C. by the TQ value.

The TQ value is a value relating to the molecular weight of a polymer, and is represented by a temperature at which the volume flow rate is 100 mm$^3$/sec. The volume flow rate is the amount of a polymer extruded represented by the unit mm$^3$/sec, when a polymer is melted and extruded from an orifice (diameter: 1 mm, length: 1 mm) at a constant temperature under an elevated pressure of 3 MPa. The TQ value is an index of the molecular weight of a polymer, and the higher the TQ value, the higher the molecular weight.

(Ion Exchange Membrane)

An ion exchange membrane can be obtained by forming the fluorinated copolymer obtained by the present invention into a membrane. A process for producing an ion exchange membrane comprises a step of forming the fluorinated copolymer into a membrane and a step of converting the carboxylic acid functional groups or the sulfonic acid functional groups in the fluorinated copolymer to an acid form by hydrolysis. Either of the membrane-forming step and the conversion step may be carried out first, however, it is preferred to carry out the membrane-forming step first and then carry out the conversion step.

The ion exchange membrane may be a laminate having a plurality of layers containing the fluorinated copolymer obtained by the production process of the present invention, the layers differing in the ion exchange capacity of the fluorinated copolymer; may be a laminate of a layer containing the fluorinated copolymer having carboxylic acid functional groups and a layer containing the fluorinated copolymer having sulfonic acid functional groups, each obtained by the production process of the present invention; or may be a laminate having a reinforcing material.

The reinforcing material may, for example, be woven fabric (cloth), fibers or nonwoven fabric.

The ion exchange membrane may be applicable to alkali chloride electrolysis, dialysis, ozone electrolysis, electrolytic reduction, an electrolyte membrane for a fuel cell, a polymer catalyst and the like, and is suitable for alkali chloride electrolysis of e.g. sodium chloride, and an electrolyte membrane for a fuel cell.

(Function and Effect)

According to the above-described process for producing a fluorinated copolymer of the present invention, in the step (II) or (II'), the mixture containing the fluorinated copolymer and the unreacted monomer and as the case requires, the polymerization medium, is continuously or intermittently transferred to an evaporation container equipped with a stirring machine little by little and heated in the evaporation container with stirring to evaporate and recover the unreacted monomer and the polymerization medium, and accordingly the fluorinated copolymer is less likely to be agglomerated and is formed into relatively small particles as compared with a case where a large amount of the mixture is heated all at once in a reactor or the like. Thus, heat transfer from the evaporation container to the fluorinated copolymer in the form of particles will efficiently be carried out, the polymerization medium and the unreacted monomer contained in the fluorinated copolymer in the form of particles are sufficiently heated and evaporated, whereby the polymerization medium and the unreacted monomer contained in the fluorinated copolymer in the form of particles will efficiently be recovered.

Further, in the step (III) or (III'), the fluorinated copolymer in the form of particles obtained in the step (II) or (II') is washed with a washing medium, and accordingly the lower polymer contained in the obtainable fluorinated copolymer may readily be reduced at a low cost. As a result, bubbling at the time of forming the fluorinated copolymer into a film may be suppressed, and further, when a film of the fluorinated copolymer is laminated with another film, peeling at their interface may be suppressed.

Further, since the fluorinated monomer having a carboxylic acid functional group or a sulfonic acid functional group which is expensive is efficiently recovered, a fluorinated copolymer excellent in the heat resistance, the solvent resistance, the chemical resistance and the like, suitable for an ion exchange membrane, can be produced at a low cost.

Further, a high quality fluorinated copolymer can be produced since the unreacted monomer and the lower polymer remaining in the fluorinated copolymer are small.

EXAMPLES

Now, the present invention will be described in further detail with reference to Examples. However, it should be understood that the present invention is by no means restricted to such specific Examples.

Ex. 4 to 10, 14 to 17 and 21 to 24 are Examples of the present invention, and Ex. 1 to 3, 11 to 13 and 18 to 20 are Comparative Examples.

(Amount of Remaining Unreacted Monomer)

The amount of the unreacted monomer remaining in the fluorinated copolymer was calculated from the mass of volatile components when heated to 150° C. analyzed by Headspace GC/MASS, per 100 mass % of the fluorinated copolymer.

(Degree of Swelling)

The degree of swelling of the fluorinated copolymer was determined as follows.

(Method for Measuring Degree of Swelling)

1. The fluorinated copolymer obtained in the step (II) or (II') was hot-pressed to be formed into a film having a thickness of 100 μm, a sample having a size of 20 mm×20 mm was cut from the film, and its dry mass (WA1) was measured;

2. The sample was dipped in 50 g of a solvent at the washing temperature in the step (III) or (III') for 16 hours;

3. The sample was taken out from the solvent, the solvent on the surface of the sample was quickly wiped off, and the mass (WA2) of the sample was measured;

4. The degree of swelling was determined from the following formula (1):

$$\text{Degree of swelling (\%)} = (WA2 - WA1)/WA1 \times 100 \qquad (1)$$

(Amount of Extracted Oligomer)

The amount of an extracted oligomer extracted from the fluorinated copolymer by washing in the step (III) or (III') was determined as follows.

1. The mass (WB1) of the fluorinated copolymer obtained in the step (II) or (II') was measured after drying.

2. The step (III) or (III') was carried out.

3. After the step (III) or (III'), the fluorinated copolymer and the washing medium were separated by filtration, the liquid phase was dried, and the remaining volatile components were regarded as the extracted oligomer. The mass (WB2) of the extracted oligomer was measured after vacuum drying at 120° C.

4. The amount of the extracted oligomer was determined from the following formula (3):

Amount (%) of extracted oligomer=(WB2)/WB1×100  (3)

(Bubbling of Ion Exchange Membrane)

The fluorinated copolymer was pressed under conditions of temperature: TQ temperature, time: 30 seconds and pressure: 1 MPaG, to prepare an ion exchange membrane having a thickness of about 100 μm. The ion exchange membrane was visually observed and evaluated based on the following standards:

○: No bubbling observed at all.
Δ: Bubbling slightly confirmed.
×: Bubbling significantly confirmed.

(TQ Value)

The TQ value is a value relating to the molecular weight of a polymer, and represents a temperature at which the volume flow rate is 100 mm$^3$/sec. The volume flow rate is represented by the amount of the fluorinated copolymer extruded represented by the unit mm$^3$/sec when the fluorinated copolymer is melted and extruded from an orifice (diameter: 1 mm, length: 1 mm) at a constant temperature under an elevated pressure of 3 MPa, using Shimadzu Flow Test CFT-100D (manufactured by Shimadzu Corporation).

(Ion Exchange Capacity)

0.7 g of the fluorinated copolymer and 5 mL of a 0.1N sodium hydroxide aqueous solution were added to a polycarbonate container and left at rest at 60° C. for 18 hours to completely convert carboxylic acid functional groups or sulfonic acid functional groups in the fluorinated copolymer to Na-form. The resulting solution was subjected to back titration with a 0.1N hydrochloric acid aqueous solution, and the amount of sodium hydroxide in the solution was obtained, whereby the ion exchange capacity of the fluorinated copolymer was calculated.

Ex. 1

(Step (I))

A stainless steel reactor (autoclave) having an internal capacity of 94 L (little) was evacuated of air, and 20 kg of $CF_3CF_2CF_2CF_2CF_2H$ (1,1,1,2,2,3,3,4,4,5,5,6,6-tridecafluorohexane (hereinafter referred to as C6H), 36.5 kg of compound (m2-1) and 5.65 g of 2,2'-azobis(dimethyl isobutyrate) (hereinafter referred to as V601) were charged and heated until the internal temperature of the reactor reached 70° C.

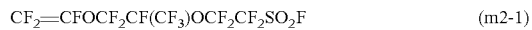

$CF_2$=$CFOCF_2CF(CF_3)OCF_2CF_2SO_2F$ (m2-1)

Then, TFE was charged until the internal pressure of the reactor reached 1.0 MPaG. During the polymerization reaction, TFE was continuously added so that the pressure would be constant at 1.0 MPaG. At a time when the amount of TFE introduced after initiation of the reaction reached 5.1 kg, the reactor was cooled to 30° C., and unreacted TFE was discharged out of the system to complete the polymerization. The obtained mixture of fluorinated copolymer, C6H and compound (m2-1) will be referred to as slurry A. Further, C6H was added so that the concentration of fluorinated copolymer contained in slurry A became 7.7 mass % to prepare slurry B.

(Agglomeration Step)

71 kg of slurry B at 40° C. was poured into 86 kg of a solvent mixture of C6H and $CF_3CH_2OCF_2CF_2H$ (hereinafter referred to as AE3000) (C6H/AE3000=1/9 (mass ratio)) with stirring at room temperature under atmospheric pressure to agglomerate fluorinated copolymer, followed by solid-liquid separation by filtration to recover fluorinated copolymer. Then, using 23 kg of C6H/AE3000=1/9 (mass ratio), washing with stirring and filtration were repeated 5 times to recover fluorinated copolymer.

The amount of the extracted oligomer was measured by evaporation for recovery of a liquid phase separated by filtration after the first agglomeration.

The amount of the extracted oligomer, the result of evaluation of bubbling of the ion exchange membrane, and the TQ value and the ion exchange capacity of fluorinated copolymer are shown in Table 1.

Ex. 2

(Step (II))

71 kg of slurry B obtained in step (I) in Ex. 1 was prepared.

A stainless steel autoclave having an internal capacity of 100 L equipped with a helical ribbon stirring blade was evacuated of air to a degree of vacuum of 4 kPaA. Further, a jacket of the autoclave was heated by flowing a steam.

While the stirring machine of the autoclave was rotated at a rate of 85 rpm, slurry B was continuously transferred to evaporate and recover C6H and compound (m2-1). While slurry B was transferred, the rate of transfer of slurry B was adjusted to maintain an internal pressure in the autoclave of from 2 to 20 kPaA and an internal temperature of from 55 to 65° C., and slurry B was treated over a period of 3 hours (average supply amount per unit time: 24 kg/h). The autoclave was cooled, the pressure was recovered to normal pressure by nitrogen gas and the autoclave was opened, whereupon fluorinated copolymer in the form of particles was obtained. The amount of unreacted compound (m2-1) contained in fluorinated copolymer was 0.2 mass % per 100 mass % of fluorinated copolymer.

With respect to the obtained fluorinated copolymer, bubbling of an ion exchange membrane was evaluated. The result is shown in Table 1.

Ex. 3

(Dissolution/Agglomeration Step)

20 g of fluorinated copolymer in the form of particles obtained in step (II) in Ex. 2 was prepared.

Fluorinated copolymer was poured into 500 g of $CClF_2CF_2CClFH$ (degree of swelling of fluorinated copolymer: 100%, hereinafter referred to as 225cb) with stirring at 60° C. under atmospheric pressure, followed by stirring for 16 hours. After cooling to room temperature, 150 g of $CH_3CCl_2F$ (hereinafter referred to as 141b) was added to agglomerate fluorinated copolymer, followed by solid-liquid separation by filtration to recover fluorinated copolymer. The liquid phase separated by filtration was evaporated to measure the amount of the extracted oligomer.

The degree of swelling of fluorinated copolymer under conditions for agglomeration, the amount of the extracted oligomer, the result of evaluation of bubbling of the ion exchange membrane, and the TQ value and the ion exchange capacity of fluorinated copolymer, are shown in Table 1.

Ex. 4

(Step (III))

40 g of fluorinated copolymer in the form of particles obtained in step (II) in Ex. 2 was prepared.

Fluorinated copolymer in the form of particles was poured into 800 g of AE3000 with stirring at 100 rpm at 60° C. under atmospheric pressure, followed by stirring for 16 hours. The mixture was subjected to solid-liquid separation by filtration to recover fluorinated copolymer. The liquid phase separated by filtration was evaporated to measure the amount of the extracted oligomer.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 1.

Ex. 5

(Step (III))

20 g of fluorinated copolymer recovered in step (III) in Ex. 4 was prepared.

The recovered fluorinated copolymer was poured into 400 g of AE3000 with stirring at 100 rpm at 60° C. under atmospheric pressure, followed by stirring for 16 hours. The mixture was subjected to solid-liquid separation by filtration to recover fluorinated copolymer.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 1.

Ex. 6

(Step (III))

Fluorinated copolymer was washed and recovered in the same manner as in Ex. 4 except that 800 g of AE3000 was changed to 400 g of AE3000.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 1.

Ex. 7

(Step (III))

Fluorinated copolymer was washed and recovered in the same manner as in Example 4 except that 800 g of AE3000 was changed to 400 g of a solvent mixture (C6H/AE3000=3/7 (mass ratio)).

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 1.

Ex. 8

(Step (III))

Fluorinated copolymer was washed and recovered in the same manner as in Example 4 except that 800 g of AE3000 was changed to 400 g of a solvent mixture (C6H/AE3000=4/6 (mass ratio)).

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 1.

Ex. 9

(Step (III))

Fluorinated copolymer was washed and recovered in the same manner as in Example 4 except that 800 g of AE3000 was changed to 400 g of a solvent mixture (C6H/AE3000=5/5 (mass ratio)).

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 1.

Ex. 10

(Step (III))

Fluorinated copolymer was washed in the same manner as in Ex. 4 except that 800 g of AE3000 was changed to 400 g of a solvent mixture (C6H/AE3000=7/3 (mass ratio)). Since part of fluorinated copolymer gelated, solid-liquid separation by filtration could not be carried out. Therefore, AE3000 was further added to such an extent that fluorinated copolymer settled, and solid-liquid separation was slowly carried out by pressure filtration under 0.3 MPaG over a period of one week while filter paper was changed several times to recover fluorinated copolymer.

The degree of swelling of fluorinated copolymer under conditions in the step (III), the amount of the extracted oligomer and the ion exchange capacity of fluorinated copolymer are shown in Table 1.

TABLE 1

| | | Agglomeration step, step (III) | | | | |
|---|---|---|---|---|---|---|
| Ex. | Step | Agglomeration medium, washing medium (mass ratio) | Amount of medium relative to copolymer (times by mass) | Temperature (° C.) | Pressure (MPaG) | Degree of swelling (%) |
| 1 | (I)→ agglomeration | C6H/AE3000 (1/9) | 40 | 40° C.→room temperature | 0 | Before agglomeration: 230 Agglomeration: 35 |
| 2 | (I)→(II) | — | — | — | — | — |
| 3 | (I)→(II)→ dissolution/ agglomeration | Dissolution: 225cb Agglomeration: 225cb/141b | 25 | 60 | 0 | Dissolution: 100 Agglomeration: 25 |
| 4 | (I)→(II)→(III) | AE3000 | 20 | 60 | 0 | 18 |
| 5 | (I)→(II)→(III) × 2 | AE3000 | 20 | 60 | 0 | 18 |

TABLE 1-continued

| | | | | | |
|---|---|---|---|---|---|
| 6 | (I)→(II)→(III) | AE3000 | 10 | 60 | 0 | 18 |
| 7 | (I)→(II)→(III) | C6H/AE3000 (3/7) | 10 | 60 | 0 | 50 |
| 8 | (I)→(II)→(III) | C6H/AE3000 (4/6) | 10 | 60 | 0 | 70 |
| 9 | (I)→(II)→(III) | C6H/AE3000 (5/5) | 10 | 60 | 0 | 90 |
| 10 | (I)→(II)→(III) | C6H/AE3000 (7/3) | 10 | 60 | 0 | 140 |

| | Agglomeration step, step (III) | | Evaluation | | | |
|---|---|---|---|---|---|---|
| Ex. | Time (h) | Stirring number of revolution (rpm) | Extracted oligomer (wt %) | Bubbling | TQ (° C.) | Ion exchange capacity (meq/g) |
| 1 | 0.5 | 60 | 1.17 | ○ | 237 | 1.106 |
| 2 | — | — | — | x | — | — |
| 3 | 16 | — | 2.12 | ○ | 237 | 1.106 |
| 4 | 16 | 100 | 0.36 | Δ | 233 | 1.116 |
| 5 | 16 | 100 | 0.09 | Δ | 233 | 1.116 |
| 6 | 16 | 100 | 0.35 | Δ | 233 | 1.118 |
| 7 | 16 | 100 | 1.18 | ○ | 235 | 1.113 |
| 8 | 16 | 100 | 1.82 | ○ | 235 | 1.110 |
| 9 | 16 | 100 | 2.21 | ○ | 236 | 1.109 |
| 10 | 16 | 100 | 8.80 | ○ | 239 | 1.100 |

By carrying out the step (II) in Ex. 2, the amount of unreacted compound (m2-1) contained in fluorinated copolymer was reduced, that is, the unreacted monomer could efficiently be recovered from slurry B. Here, in a case where slurry B is charged to the autoclave all at once, and the jacket is heated at 80° C. for 3 hours under reduced pressure to evaporate C6H and compound (m2-1), the amount of unreacted compound (m2-1) contained in agglomerated fluorinated copolymer is 11 mass % per 100 mass % of fluorinated copolymer.

In Ex. 4 to 10 in which the step (III) was carried out, the oligomer contained in fluorinated copolymer could be extracted, and bubbling of the ion exchange membrane was suppressed as compared with Ex. 2 in which the step (III) was not carried out.

Further, in Ex. 4 to 6 in which a solvent which makes the degree of swelling of fluorinated copolymer low was used in the step (III), bubbling of the ion exchange membrane was slightly confirmed.

In Ex. 10 in which a solvent which makes the degree of swelling of fluorinated copolymer high was used in the step (III), recovery of fluorinated copolymer by filtration was difficult.

Ex. 11

(Step (I))

Slurry B was prepared in the same manner as in the step (I) in Ex. 1 except that 28.42 kg of C6H, 27.92 kg of compound (m2-1) and 8.45 g of V601 were used, the polymerization temperature was 73° C., the pressure was 0.95 MPaG, and the amount of TFE introduced was 5.5 kg.

(Agglomeration Step)

Fluorinated copolymer was recovered in the same manner as in the agglomeration step in Ex. 1 except that slurry B obtained in the step (I) in Ex. 11 was used instead of slurry B obtained in the step (I) in Ex. 1. Then, using 23 kg of C6H/AE3000=1/9 (mass ratio), washing with stirring and filtration were repeated 5 times to recover fluorinated copolymer.

The amount of the extracted oligomer was measured by evaporation for recovery of a liquid phase separated by filtration after the first agglomeration.

The amount of the extracted oligomer, the result of evaluation of bubbling of the ion exchange membrane, and the TQ value and the ion exchange capacity of fluorinated copolymer are shown in Table 2.

Ex. 12

(Step (II))

Fluorinated copolymer in the form of particles was obtained in the same manner as in the step (II) in Ex. 2 except that slurry B obtained in the step (I) in Ex. 11 was used instead of slurry B obtained in the step (I) in Ex. 1. The amount of unreacted compound (m2-1) contained in fluorinated copolymer was 0.2 mass % per 100 mass % of fluorinated copolymer.

With respect to the obtained fluorinated copolymer, bubbling of the ion exchange membrane was evaluated. The result is shown in Table 2.

Ex. 13

(Dissolution/Agglomeration Step)

Fluorinated copolymer was recovered in the same manner as in the dissolution/agglomeration step in Ex. 3 except that fluorinated copolymer in the form of particles obtained in the step (II) in Ex. 12 was used instead of fluorinated copolymer in the form of particles obtained in the step (II) in Ex. 2.

The degree of swelling of fluorinated copolymer under agglomeration conditions, the amount of the extracted oligomer, the result of evaluation of bubbling of the ion exchange membrane, and the TQ value and the ion exchange capacity of fluorinated copolymer are shown in Table 2.

Ex. 14

(Step (III))

Fluorinated copolymer was recovered in the same manner as in the step (III) in Ex. 4 except that fluorinated copolymer in the form of particles obtained in the step (II) in Ex. 12 was used instead of fluorinated copolymer in the form of particles obtained in the step (II) in Ex. 2, and 1,000 g of AE3000 was used.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 2.

Ex. 15

(Step (III))

Fluorinated copolymer was recovered in the same manner as in the step (III) in Ex. 5 except that fluorinated copolymer recovered in the step (III) in Ex. 14 was used instead of fluorinated copolymer recovered in the step (Ill) in Ex. 4, and 1,000 g of AE3000 was used.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 2.

Ex. 16

(Step (III))

Fluorinated copolymer was washed and recovered in the same manner as in Ex. 14 except that 400 g of a solvent mixture (C6H/AE3000=3/7 (mass ratio)) was used instead of 1,000 g of AE3000.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 2.

Ex. 17

(Step (III))

40 g of fluorinated copolymer in the form of particles obtained in the step (II) in Ex. 12 was prepared.

Fluorinated copolymer in the form of particles was poured to 400 g of a solvent mixture (C6H/AE3000=6/4 (mass ratio)) with stirring at 100 rpm at room temperature under atmospheric pressure, followed by stirring for 16 hours. The mixture was subjected to solid-liquid separation by filtration to recover fluorinated copolymer.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 2.

TABLE 2

| | | Agglomeration step, step (III) | | | | |
|---|---|---|---|---|---|---|
| Ex. | Step | Agglomeration medium, washing medium (mass ratio) | Amount of medium relative to copolymer (times by mass) | Temperature (° C.) | Pressure (MPaG) | Degree of swelling (%) |
| 11 | (I)→ agglomeration | C6H/AE3000 (1/9) | 40 | 40° C.→room temperature | 0 | Before agglomeration: 120 Agglomeration: 18 |
| 12 | (I)→(II) | — | — | — | — | — |
| 13 | (I)→(II)→ dissolution/ agglomeration | Dissolution: 225cb Agglomeration: 225cb/141b | 25 | 60 | 0 | Dissolution: 100 Agglomeration: 25 |
| 14 | (I)→(II)→(III) | AE3000 | 25 | 60 | 0 | 16 |
| 15 | (I)→(II)→(III) × 2 | AE3000 | 25 | 60 | 0 | 16 |
| 16 | (I)→(II)→(III) | C6H/AE3000 (3/7) | 10 | 60 | 0 | 40 |
| 17 | (I)→(II)→(III) | C6H/AE3000 (6/4) | 10 | Room temperature | 0 | 85 |

| | Agglomeration step, step (III) | | Evaluation | | | |
|---|---|---|---|---|---|---|
| Ex. | Time (h) | Stirring number of revolution (rpm) | Extracted oligomer (wt %) | Bubbling | TQ (° C.) | Ion exchange capacity (meq/g) |
| 11 | 0.5 | 60 | 0.75 | ○ | 238 | 1.001 |
| 12 | — | — | — | x | — | — |
| 13 | 16 | — | 1.86 | ○ | 238 | 1.000 |
| 14 | 16 | 100 | 0.40 | Δ | 234 | 0.992 |
| 15 | 16 | 100 | 0.10 | Δ | 234 | 1.003 |
| 16 | 16 | 100 | 0.83 | ○ | 238 | 1.014 |
| 17 | 16 | 100 | 1.95 | ○ | 236 | 1.009 |

By carrying out the step (II) in Ex. 12, the amount of unreacted compound (m2-1) contained in fluorinated copolymer was reduced, that is, the unreacted monomer could efficiently be recovered from slurry B. Here, in a case where slurry B is charged to the autoclave all at once, and the jacket is heated to evaporate C6H and compound (m2-1), the amount of unreacted compound (m2-1) contained in agglomerated fluorinated copolymer is 9 mass % per 100 mass % of fluorinated copolymer.

In Ex. 14 to 17 in which the step (III) was carried out, the oligomer contained in fluorinated copolymer could be extracted, and bubbling of the ion exchange membrane was suppressed as compared with Ex. 12 in which the step (III) was not carried out.

Further, in Ex. 14 to 15 in which a solvent which makes the degree of swelling of fluorinated copolymer low was used in the step (III), bubbling of the ion exchange membrane was slightly confirmed.

Ex. 18

(Step (I))

Slurry B was prepared in the same manner as in the step (I) in Ex. 11.

(Agglomeration Step)

Fluorinated copolymer was recovered in the same manner as in the agglomeration step in Ex. 1 except that slurry B obtained in the step (I) in Ex. 18 was used instead of slurry B obtained in the step (I) in Ex. 1. Then, using 23 kg of C6H/AE3000=1/9 (mass ratio), washing with stirring and filtration were repeated 5 times to recover fluorinated copolymer.

The amount of the extracted oligomer was measured by evaporation for recovery of a liquid phase separated by filtration after the first agglomeration.

The amount of the extracted oligomer, the result of evaluation of bubbling of the ion exchange membrane, and the TQ value and the ion exchange capacity of fluorinated copolymer are shown in Table 3.

Ex. 19

(Step (II))

Fluorinated copolymer in the form of particles was obtained in the same manner as in the step (II) in Ex. 2 except that slurry B obtained in the step (I) in Ex. 18 was used instead of slurry B obtained in the step (I) in Ex. 1. The amount of unreacted compound (m2-1) contained in fluorinated copolymer was 0.2 mass % per 100 mass % of fluorinated copolymer.

With respect to the obtained fluorinated copolymer, bubbling of the ion exchange membrane was evaluated. The result is shown in Table 3.

Ex. 20

(Dissolution/Agglomeration Step)

Fluorinated copolymer was recovered in the same manner as in the dissolution/agglomeration step in Ex. 3 except that fluorinated copolymer in the form of particles obtained in the step (II) in Ex. 19 was used instead of fluorinated copolymer in the form of particles obtained in the step (II) in Ex. 2.

The degree of swelling of fluorinated copolymer under agglomeration conditions, the amount of the extracted oligomer, the result of evaluation of bubbling of the ion exchange membrane, and the TQ value and the ion exchange capacity of fluorinated copolymer are shown in Table 3.

Ex. 21

(Step (III))

Fluorinated copolymer was recovered in the same manner as in the step (III) in Ex. 9 except that fluorinated copolymer in the form of particles obtained in the step (II) in Ex. 19 was used instead of fluorinated copolymer in the form of particles obtained in the step (II) in Ex. 2.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 3.

Ex. 22

(Step (III))

Fluorinated copolymer was recovered in the same manner as in the step (III) in Ex. 21 except that the stirring number of revolutions was changed to 30 rpm.

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 3.

Ex. 23

(Step (III))

Fluorinated copolymer was washed and recovered in the same manner as in Ex. 21 except that a solvent mixture (C6H/AE3000=6/4 (mass ratio)) was used instead of the solvent mixture (C6H/AE3000=5/5 (mass ratio)).

The degree of swelling of fluorinated copolymer under conditions in the step (III), the amount of the extracted oligomer, the result of evaluation of bubbling of the ion exchange membrane, and the TQ value and the ion exchange capacity of fluorinated copolymer are shown in Table 3.

Ex. 24

(Step (III))

Fluorinated copolymer was washed in the same manner as in Ex. 21 except that a solvent mixture (C6H/AE3000=7/3 (mass ratio)) was used instead of the solvent mixture (C6H/AE3000=5/5 (mass ratio)). Since part of fluorinated copolymer gelated, solid-liquid separation by filtration could not be carried out. Accordingly, solid-liquid separation was slowly carried out by pressure filtration under 0.3 MPaG over a period of 1 week while filter paper was changed several times to recover fluorinated copolymer.

The degree of swelling of fluorinated copolymer under conditions in the step (III), the amount of the extracted oligomer and the ion exchange capacity of fluorinated copolymer are shown in Table 3.

TABLE 3

| | | Agglomeration step, step (III) | | | | |
|---|---|---|---|---|---|---|
| Ex. | Step | Agglomeration medium, washing medium (mass ratio) | Amount of medium relative to copolymer (times by mass) | Temperature (° C.) | Pressure (MPaG) | Degree of swelling (%) |
| 18 | (I)→agglomeration | C6H/AE3000 (1/9) | 40 | 40° C.→room temperature | 0 | Before agglomeration: 120 Agglomeration: 18 |
| 19 | (I)→(II) | — | — | — | — | — |
| 20 | (I)→(II)→dissolution/agglomeration | Dissolution: 225cb Agglomeration: 225cb/141b | 25 | 60 | 0 | Dissolution: 100 Agglomeration: 20 |
| 21 | (I)→(II)→(III) | C6H/AE3000 (5/5) | 10 | 60 | 0 | 65 |
| 22 | (I)→(II)→(III) | C6H/AE3000 (5/5) | 10 | 60 | 0 | 65 |
| 23 | (I)→(II)→(III) | C6H/AE3000 (6/4) | 10 | 60 | 0 | 85 |
| 24 | (I)→(II)→(III) | C6H/AE3000 (7/3) | 10 | 60 | 0 | 120 |

TABLE 3-continued

| | Agglomeration step, step (III) | | Evaluation | | | |
|---|---|---|---|---|---|---|
| Ex. | Time (h) | Stirring number of revolution (rpm) | Extracted oligomer (wt %) | Bubbling | TQ (° C.) | Ion exchange capacity (meq/g) |
| 18 | 0.5 | 60 | 1.9 | o | 235 | 0.999 |
| 19 | — | — | — | x | — | — |
| 20 | 16 | — | 2.25 | o | 235 | 0.999 |
| 21 | 16 | 100 | 3.02 | o | 235 | 0.996 |
| 22 | 16 | 30 | 1.78 | o | 235 | 1.000 |
| 23 | 16 | 100 | 3.85 | o | 240 | 0.993 |
| 24 | 16 | 100 | 5.81 | o | 242 | 0.995 |

By carrying out the step (II) in Ex. 19, the amount of unreacted compound (m2-1) contained in fluorinated copolymer was reduced, that is, the unreacted monomer could efficiently be recovered from slurry B. Here, in a case where slurry B is charged to the autoclave all at once, and the jacket is heated at 80° C. for 3 hours under reduced pressure to evaporate C6H and compound (m2-1), the amount of unreacted compound (m2-1) contained in agglomerated fluorinated copolymer is 9 mass % per 100 mass % of fluorinated copolymer.

In Ex. 21 to 24 in which the step (III) was carried out, the oligomer contained in fluorinated copolymer could be extracted, and bubbling of the ion exchange membrane was suppressed as compared with Ex. 19 in which the step (III) was not carried out.

In Ex. 24 in which a solvent which makes the degree of swelling of fluorinated copolymer high was used in the step (III), recovery of fluorinated copolymer by filtration was difficult.

INDUSTRIAL APPLICABILITY

The fluorinated copolymer obtained by the production process of the present invention has a low content of the unreacted monomer, the lower polymer and the like, has high quality, is excellent in the heat resistance, the chemical resistance and the like, and is thereby useful as an ion exchange membrane for alkali chloride electrolysis, an electrolyte membrane for a duel cell, and the like.

This application is a continuation of PCT Application No. PCT/JP2013/077147, filed on Oct. 4, 2013, which is based upon and claims the benefit of priority from Japanese Patent Application No. 2012-237834 filed on Oct. 29, 2012. The contents of those applications are incorporated herein by reference in their entireties.

What is claimed is:

1. A process for producing a fluorinated copolymer, which comprises:
   (I) polymerizing a fluorinated monomer having a carboxylic acid functional group or a sulfonic acid functional group and a fluorinated olefin in a polymerization medium to obtain a mixture containing a fluorinated copolymer, the unreacted monomer and the polymerization medium;
   (II) continuously or intermittently transferring mixture obtained in (I) to an evaporation container equipped with a stirring machine and heating the mixture in the evaporation container with stirring to evaporate and recover the unreacted monomer and the polymerization medium and to obtain the fluorinated copolymer; and
   (III) washing the fluorinated copolymer obtained in (II) with a washing medium.

2. A process for producing a fluorinated copolymer, which comprises:
   (I') a step of polymerizing a fluorinated monomer having a carboxylic acid functional group or a sulfonic acid functional group and a fluorinated olefin to obtain a mixture containing a fluorinated copolymer and the unreacted monomer;
   (II') continuously or intermittently transferring the mixture obtained in (I') to an evaporation container equipped with a stirring machine and heating the mixture in the evaporation container with stirring to evaporate and recover the unreacted monomer and to obtain the fluorinated copolymer; and
   (III') washing the fluorinated copolymer obtained in (II') with a washing medium.

3. The process for producing a fluorinated copolymer according to claim 1, wherein the proportion of units of the fluorinated monomer having a carboxylic acid functional group or a sulfonic acid functional group in the fluorinated copolymer is from 15 to 85 mass %.

4. The process for producing a fluorinated copolymer according to claim 1, wherein the proportion on of fluorinated olefin units in the fluorinated copolymer is from 10 to 90 mass %.

5. The process for producing a fluorinated copolymer according to claim 1, herein the washing medium is a medium such that the degree of swelling of the fluorinated copolymer is from 30 to 100 mass %.

6. The process for producing a fluorinated copolymer according to claim 1, wherein the washing medium contains at least one member selected from the group consisting of a hydrofluorocarbon, a hydrofluoroether and a perfluorocarbon.

7. The process for producing a fluorinated copolymer according to claim 1, wherein the fluorinated monomer having a carboxylic acid functional group or a sulfonic acid functional group is a compound represented by the following formula (m1):

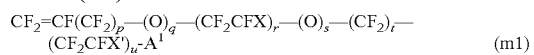

(m1)

wherein X is a fluorine atom or a trifluoromethyl group, X' is a fluorine atom or a trifluoromethyl group, $A^1$ is a carboxylic acid functional group or a sulfonic acid functional group, p is 0 or 1, q is 0 or 1, r is an integer of from 0 to 3, s is 0 or 1, t is an integer of from 0 to 12, u is an integer of from 0 to 3, and $1 \leq r+u$.

8. The process for producing a fluorinated copolymer according to claim 1, wherein the fluorinated olefin is tetrafluoroethylene.

9. The process for producing a fluorinated copolymer according to claim 1, wherein a stirring blade in the evaporation container equipped with a stirring machine is a helical ribbon blade.

10. The process for producing a fluorinated copolymer according to claim 1, wherein the mixture is transferred to the evaporation container so that the overall coefficient of heat transfer is at least 80 kJ/m$^2$·h·° C. in (II) or (II').

11. The process for producing a fluorinated copolymer according to claim 1, wherein in (III) or (III'), the fluorinated copolymer is washed with the washing medium in a stirring tank under normal pressure, followed by solid-liquid separation by filtration.

* * * * *